Nov. 15, 1932.  W. PILKINGTON  1,888,011
SURVEYING INSTRUMENT
Filed June 10, 1931  2 Sheets-Sheet 1
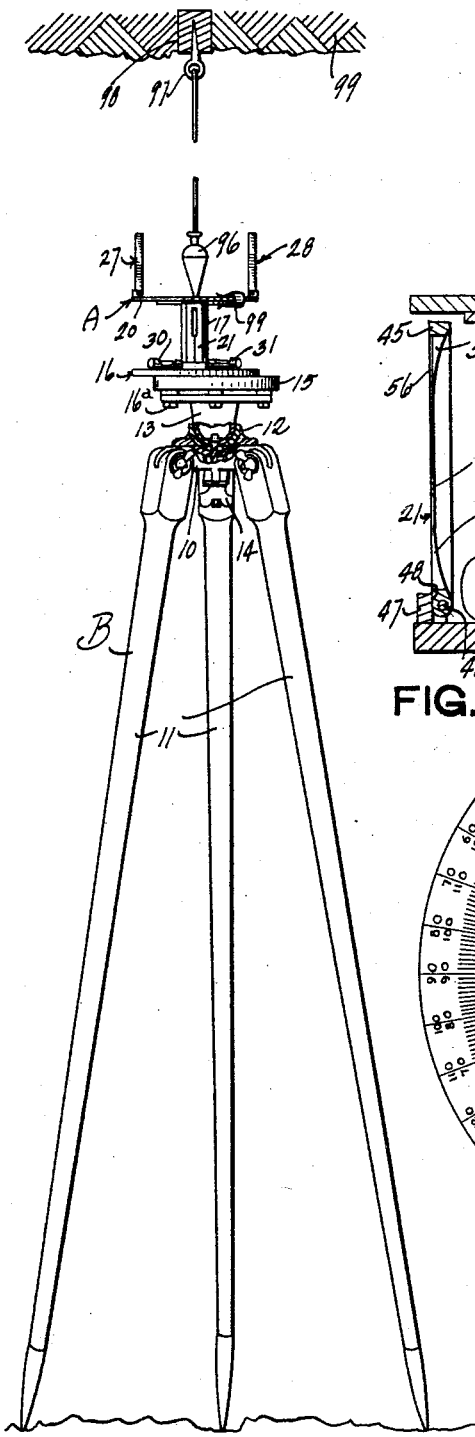
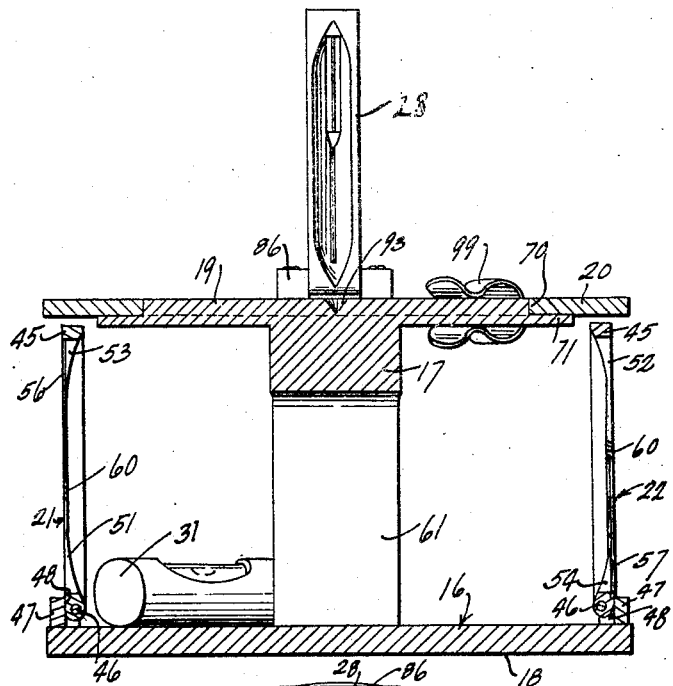
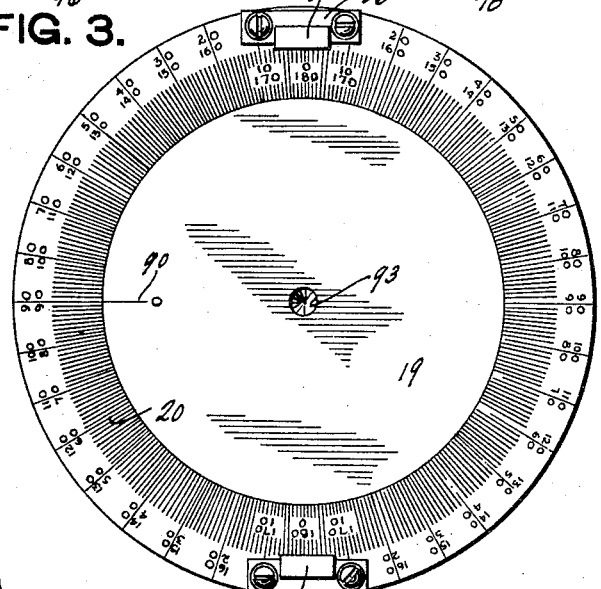
INVENTOR.
William Pilkington
BY Lancaster, Allwine and Rommel
ATTORNEYS.

Nov. 15, 1932.  W. PILKINGTON  1,888,011
SURVEYING INSTRUMENT
Filed June 10, 1931  2 Sheets-Sheet 2

INVENTOR.
William Pilkington

BY
Lancaster, Allwine and Rommel
ATTORNEYS.

Patented Nov. 15, 1932

1,888,011

UNITED STATES PATENT OFFICE

WILLIAM PILKINGTON, OF BECKLEY, WEST VIRGINIA

SURVEYING INSTRUMENT

Application filed June 10, 1931. Serial No. 543,456.

This invention relates to improvements in surveying instruments.

The primary object of this invention is the provision of an improved surveying instrument which is particularly well adapted for the laying of horizontal angles in mines, and elsewhere; the instrument being of relatively cheap construction, without the delicate parts ordinarily used in a transit. It is furthermore durable, sturdy, and compact, and because of the simplicity of the same may be used by comparatively inexperienced persons, such as section or mine foremen or a tracklayer, without the necessity of requiring a transit man.

A further object of this invention is the provision of an improved surveying instrument which embodies a double set of two-way sights, and which will permit of the laying off of angles in a horizontal plane with facility.

Other objects and advantages of this invention will be apparent during the course of the following detailed description.

In the accompanying drawings, forming a part of this specification, and wherein similar reference characters designate corresponding parts throughout the several views, Figure 1 is an elevation showing the instrument leveled and in use within a mine, part of the same being shown in section.

Figure 2 is a vertical sectional view taken through the instrument, showing it in an operating position for the laying off of a horizontal angle of 90°.

Figure 3 is a plan view of the graduated ring with the parts positioned as shown in Figure 2.

Figure 4:
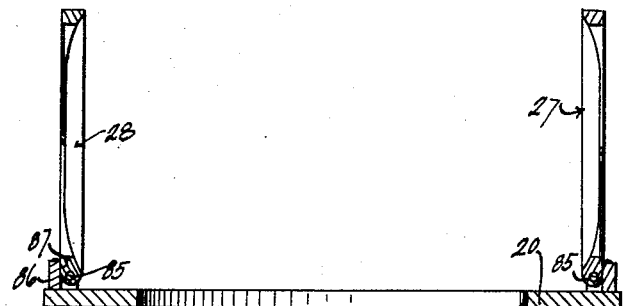
Figure 4 is a sectional view taken through an upper removable ring and sight construction of the instrument.
Figure 5:
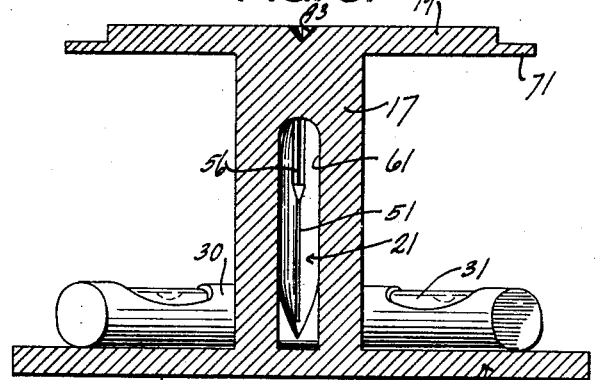
Figure 5 is a vertical sectional view of a frame construction which receives the ring of Figure 4.

In the drawings, wherein for the purpose of illustration is shown only a preferred embodiment of the invention, the letter A may generally designate the instrument, which is adapted to be used upon a conventional leveling tripod B of any approved construction.

The tripod B may include a tripod top 10 to which the legs 11 are swingably connected as in usual construction. The top 10 may have a concaved cup 12 fastened to the top 10. A part 13 having a convex bottom fits in the cup 12, as is usual. Means 14 is provided to hold the part 13 in the cup, either to clamp the same in fixed position or to hold it with proper adjustment. The part 13 is provided with a table 15 which is connected therewith by any approved means 16$^a$. This table 15 is provided with a flat top surface adapted to slidably and movably receive the instrument A thereon. This top surface of the table is of course horizontally leveled by moving the part 13 in the cup 12, or in any other approved manner conventionally used with tripod constructions.

The instrument A generally comprises a lower plate or member 16 provided with a central standard 17 normal to the plane bottom surface 18 of the plate. Upon the top of the standard 17 there is an annular supporting flange or plate member 19 peripherally reduced for rotatably supporting a graduated ring 20. Two-way sights 21 and 22 are hingedly mounted at diametrically opposed points on the plate or member 16 at opposite sides of the standard 17. The ring 20 is provided with two-way sights 27 and 28 mounted at diametrically opposed points on the said ring.

The plate 16 is relatively heavy so that it will hold a proper position upon the tripod table 15. In an instrument for use in mine surveying the plate 16 would be approximately five inches in diameter, and about one quarter of an inch thick, although it is to be understood that these dimensions may be departed from if desired. The upper surface of the plate 16 is provided with conventional bubble tubes 30 and 31 which may be relatively arranged at right angles, and which of course may be used for the purpose of leveling the tripod table, or for positioning the plate 16 in a horizontal plane.

Figure 6:
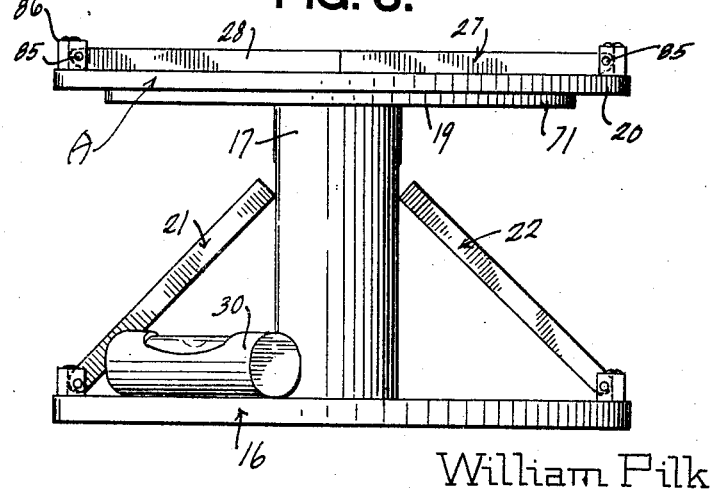
Figure 6 is a side elevation of the improved surveying instrument, showing the sights in collapsed position.

The diametrically opposed sights 21 and 22 are of the same general mounting upon the plate. They each include a sighting member 45 pivoted at 46 upon a suitable block 47; the latter being provided with a shoulder 48 against which the member 45 abuts to position it in right angled relation to the plate 16. From upright positions the pivoted portions 45 of the sights 21 and 22 may be pivotally swung inwardly towards each other into abutment against the supporting post 17 as shown in Figure 6, and in which position they are collapsed and in protected relation. These sights 21 and 22 are constructed for two-way sighting, that is, one portion of one may be used as a fore-sight and the corresponding portion of the other will be used as a back-sight, and vice versa. Thus, the lower and upper portions of the sights 21 and 22 respectively are provided with vertical sighting slits 51 and 52 respectively, which are relatively narrow. The upper and lower portions of the sights 21 and 22 are furthermore provided with vertical openings 53 and 54 respectively wherein sighting wires or hairs 56 and 57 are disposed. The intermediate portions of these sights 21 and 22 have the slit openings divided from the hairs by an intermediate solid portion 60. The standard 17 is provided with a wide vertical slot 61 through which the sighting is accomplished. These double sights permit an observer to peep through the slit 51 of the sight 21 and align the wire 57 with an object which is being sighted, and likewise sighting in the opposite direction the observer may peep through the slit 52 and in line with the wire 56 sight the proper location at which either some object is placed or to be placed.

The supporting plate or flange 19 is recessed at 70 around the top portion of the margin thereof to provide a reduced annular supporting ledge 71 upon which the ring 20 seats. The ring 20 when in position upon this ledge 71 has its top surface lying flush with the top surface of the flange or supporting plate 19, as shown in Figure 2.

The supporting ring 20 is provided with an opening 80 therein which snugly receives the raised portion of the flange or plate 19 therein, so that there is no radial movement of the ring when supported upon the flange 19.

The sights 27 and 28 upon the ring 20 are of exactly the same construction as the sights 21 and 22 above described, that is, they may be used for sighting in either direction, utilizing each of the same as a fore-sight in one portion or as a back-sight at the other portion. They are each hingedly mounted at 85 upon a block 86 which is rigidly affixed on the top surface of the ring. These blocks 86 have shoulders 87 limiting the upswing of the sights 27 and 28 respectively to a proper vertical position at right angles to the plane of the ring, and from whence they may be collapsed flat or horizontal upon the top of the ring, as shown in Figure 6.

The top surface of the plate 19 is provided with a radial indicator line 90 which may be suitably designated by a zero mark, as shown in Figure 3. Centrally of the plate 19, and of course axially of the standard 17 there is provided an upwardly facing socket 93 which is of V-shaped cross section, and is adapted to receive the point of a suspended plumb bob for leveling and centering purposes.

The top surface of the ring 20 is suitably provided with graduations, as shown in Figure 3, designating in degrees the circular arrangement of the plate; these delineations being easily referable to the indicator mark 90 above described. The delineated lines on the ring 20 may be suitably designated with the degree numerals, according to standard practice, as desired, so that an observer may readily determine the mark through which the ring is swung, with reference to the indicator mark 90. If desired, a vernier adjustment may be provided, although such is not necessary in the use for which this invention is intended. If desired the plate 19 may be circumferentially graduated.

In setting up the instrument for use the same may be properly centered with reference to the point of a suspended plumb bob 96 which is suitably supported by a spad 97 affixed in a timber or wooden insert 98 in the mine ceiling 99. This centering is accomplished by setting up the tripod B beneath the plumb bob. The instrument A is set on the table 15 and the tripod is properly leveled to place the table 15 horizontally, as indicated by the bubble tubes 30 and 31 on the instrument. The instrument is then swung laterally to center the point of the plumb bob 96 in the opening 93. The sights 21 and 22 may be used for positioning the plate 16 with reference to a known line of sight, and the ring 20 may then be swung to position the sights thereof at the desired horizontal angular relation with respect to the indicator mark 90 on the plate 19. If desired this angle may be set before the instrument is placed on the tripod. Thus it will be desirable to set the new line of sight at the known angle to the old line of sight or a predetermined line of sight. By setting up the instrument with the line of predetermined sight, the ring 20 having been adjusted to the desired angle of the new line of sight and clamped in said position by means of a clamp 99, it is readily understandable that the sights 27 and 28 will be in position to establish the new line of sight.

An important use of the instrument will be in laying out cross entries and rooms with respect to the main entries of mines. Thus plumb bobs having been suspended from the previously determined center line of a main entry it will readily be easy for an operator of the new instrument to support the device as above described under a plumb bob located at the center line of the main entry, and spot the center line of the cross entry at the proper predetermined angle with respect to the center line of the main entry. The use of the instrument for establishing the center line of cross entries and rooms will be well understood from the above description. The two sets of double sights will permit of the laying off of angles in backward and forward lines of sights at any angle in a horizontal plane, and without moving any part of the instrument it will be possible to lay off angles in four directions both forwardly and backwardly. It is of course important to know that the line of sight between the sights 21 and 22 lines in the same vertical planes with the zero indication 90 when the instrument is in set-up condition. The line of sight between the upper sights 27 and 28 is on the 0°—180° delineations of the graduated ring. Rough leveling can be done by sighting over the tops of the upper sights on the instrument.

Various changes in the shape, size, and arrangement of parts may be made to the form of invention herein shown and described, without departing from the spirit of the invention or the scope of the claims.

I claim:

1. In a surveying instrument the combination of a supporting plate, opposed sights on the plate, a rotatable ring, means for supporting the rotatable ring in a plane spaced above the said plate and above the sights of the said plate, and a pair of sights carried in spaced relation by said rotatable ring, the said instrument having graduations cooperatively placed with respect to the sights for determining the angularity of the lines of sights established by the first and second mentioned pair of sights.

2. In a surveying instrument the combination of a supporting plate, a central standard upon the plate and having a vertical slot therein, a plate supported at the top of said standard, a pair of sights at diametrically opposed sides of said standard and provided with means for projecting a line of sight through the slot of said standard, a ring rotatably supported by the second mentioned plate above the said sights, and sighting means carried by said ring, said second mentioned plate and ring having graduations thereon to determine the angularity of movement of the ring upon said plate with respect to the line of sight.

3. In a surveying instrument the combination of a base plate, sighting bars pivoted on parallel axes upon said plate, means to limit said bars to a position normal to said plate and from whence they may be collapsed inwardly, said sighting bars having means thereon to establish a line of sight thereby, a rotatable member, means rotatably supporting said member in a plane parallel with and above the first mentioned plate and the sights thereof, graduated means to determine the angularity of rotary movement of said rotary member with respect to said plate and the line of sight established by the sights of said plate, and spaced sights on the rotatable member located for establishing a line of sight in operative relation to the graduations of said rotary member.

4. In a surveying instrument the combination of a horizontal base plate, a central post having a vertical slot diametrically therethrough, sight bars pivotally mounted on said plate at diametrically opposed points on said plate in alignment with the slot through said post, said sight bars having sighting slits and hair sights thereon for establishing a line of sight therebetween through the slot of said post, and means rotatably supported by the post above said sight bars for establishing a line of sight in predetermined angularity with respect to the line of sight which may be established by the sight bars first mentioned.

5. In a surveying instrument the combination of a bottom plate, a central supporting post connected with said plate, a top plate on the top of said post having a central plumb bob point receiving recess therein, a ring rotatably supported upon the top plate, said plate and ring being graduated to determine the angular relation of movement therebetween, and sighting means carried by each of the bottom plate and ring.

6. In a surveying instrument the combination of a bottom plate, a central supporting post connected with said plate and provided with a relatively wide vertical slot, a top plate on the top of said post, a ring rotatably supported upon the top plate, said plate and ring being graduated to determine the angular relation of movement therebetween, sighting means carried by each of the bottom plate and ring, said sighting means on the bottom plate comprising sight bars pivotally mounted on the bottom plate in the line of sight through said slot and collapsible against the walls of said post.

7. In a surveying instrument the combination of a bottom plate, a top plate, standard means supporting the top plate in spaced parallel relation with the bottom plate, a rotary ring mounted on the top plate, a pair of collapsible sight bars mounted on the bottom plate, and a pair of collapsible sight bars mounted on said ring.

WILLIAM PILKINGTON.